(12) United States Patent
Kim

(10) Patent No.: US 9,811,124 B2
(45) Date of Patent: Nov. 7, 2017

(54) MOBILE TERMINAL AND CONTROLLING METHOD THEREOF

(71) Applicant: LG ELECTRONICS INC., Seoul (KR)

(72) Inventor: Sungbae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 6 days.

(21) Appl. No.: 14/925,137

(22) Filed: Oct. 28, 2015

(65) Prior Publication Data

US 2016/0132173 A1 May 12, 2016

(30) Foreign Application Priority Data

Nov. 12, 2014 (KR) .................. 10-2014-0157275

(51) Int. Cl.
*G06F 3/041* (2006.01)
*G06F 1/16* (2006.01)
*G06F 3/0488* (2013.01)

(52) U.S. Cl.
CPC .......... *G06F 1/1694* (2013.01); *G06F 3/0488* (2013.01); *G06F 2200/1637* (2013.01); *G06F 2203/04803* (2013.01); *G06F 2203/04804* (2013.01)

(58) Field of Classification Search
CPC .......... G06F 1/1694; G06F 2200/1637; G06F 2203/04803; G06F 2203/04804; G06F 3/0488
See application file for complete search history.

(56) References Cited

U.S. PATENT DOCUMENTS

| 2014/0029017 A1* | 1/2014 | Lee | ............ G01B 11/24 356/601 |
| 2014/0240260 A1* | 8/2014 | Park | ............ G06F 3/0488 345/173 |
| 2014/0313127 A1* | 10/2014 | Deng | ............ G06F 3/0487 345/156 |

FOREIGN PATENT DOCUMENTS

| KR | 1020080062193 A | 7/2008 |
| KR | 20100084905 A | 7/2010 |
| KR | 1020110056843 A | 5/2011 |
| KR | 20130032994 A | 4/2013 |

* cited by examiner

*Primary Examiner* — Insa Sadio
(74) *Attorney, Agent, or Firm* — Dentons US LLP

(57) ABSTRACT

Disclosed are a mobile terminal and controlling method thereof. The mobile terminal including components capable of executing a first function, executing a second function and displaying an execution screen associated with the second function on a touchscreen. The mobile terminal components are further capable of determining whether the mobile terminal has been tilted by an amount that exceeds a first threshold, and when it is determined that the mobile terminal has been tilted by an amount that exceeds the first threshold, displaying the execution screen associated with the second function and an execution screen associated with the first function, determining whether a touch input to the touchscreen occurs while the execution screen associated with the second function and the execution screen associated with the first function are displayed, and displaying the execution screen associated with the first function when it is determined that the touch input has occurred.

10 Claims, 21 Drawing Sheets

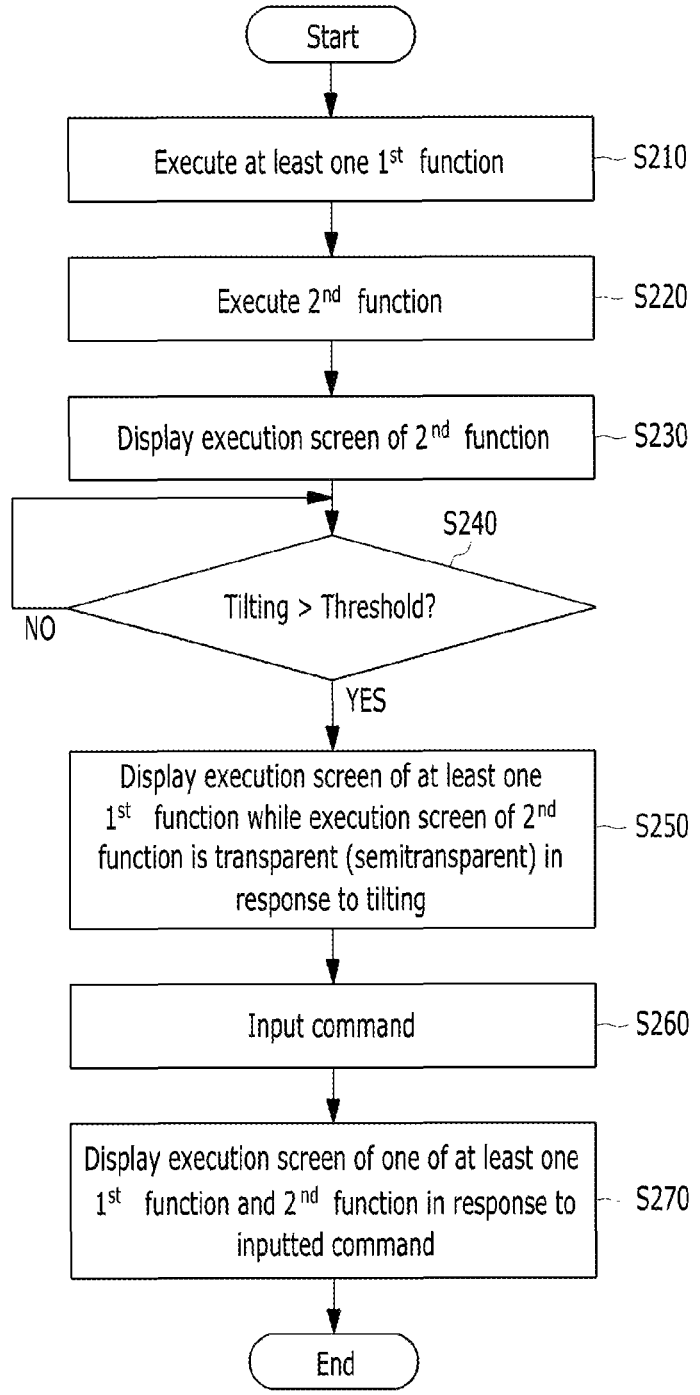

FIG. 3
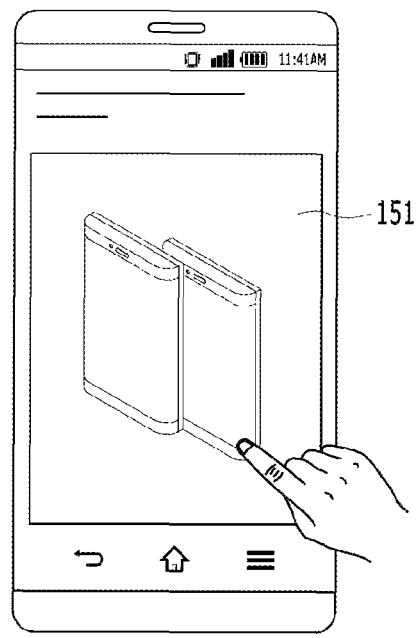
(a)
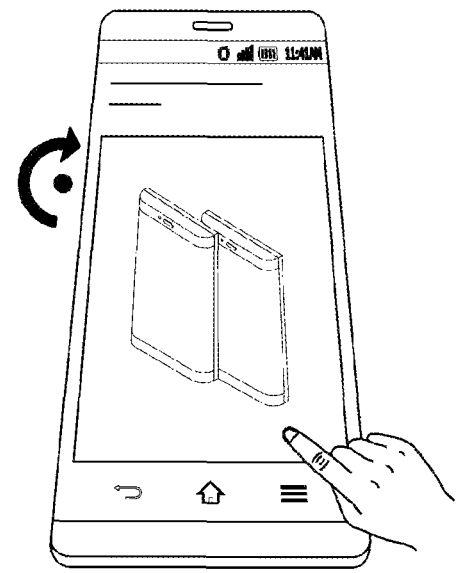
(b)
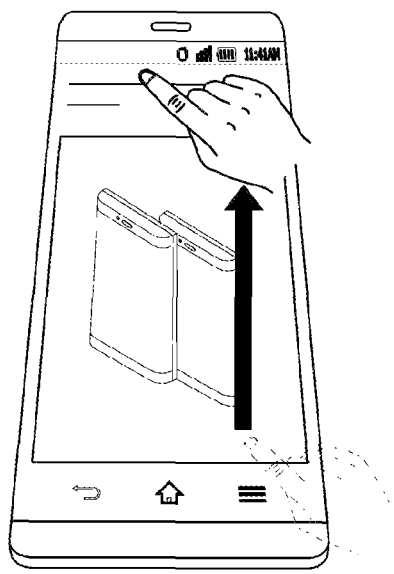
(c)
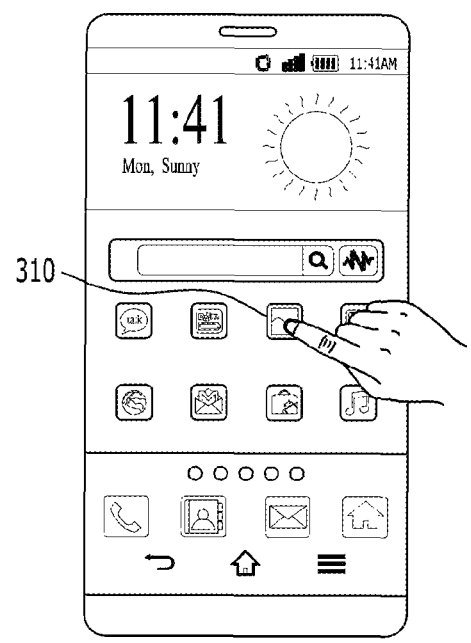
(d)

FIG. 10
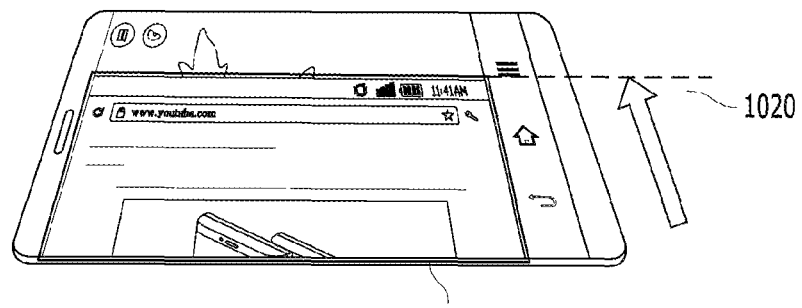
(a)
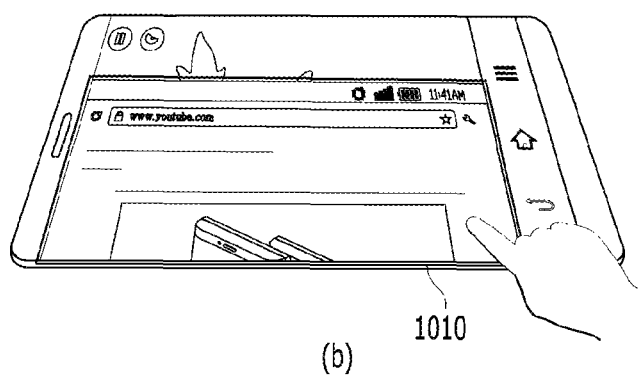
(b)
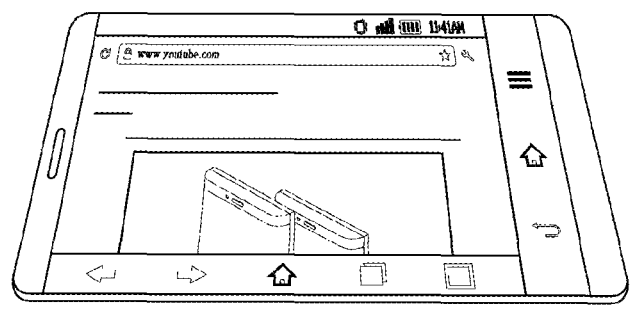
(c)

FIG. 12
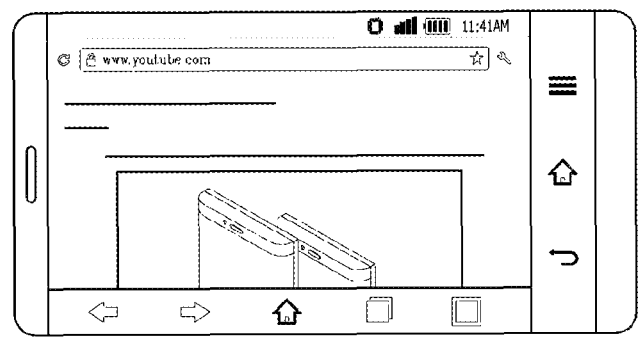
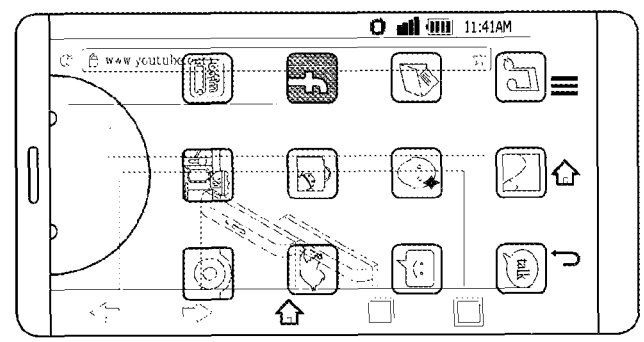
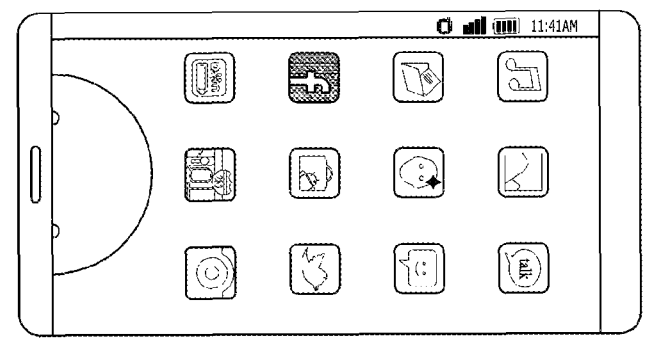

FIG. 13
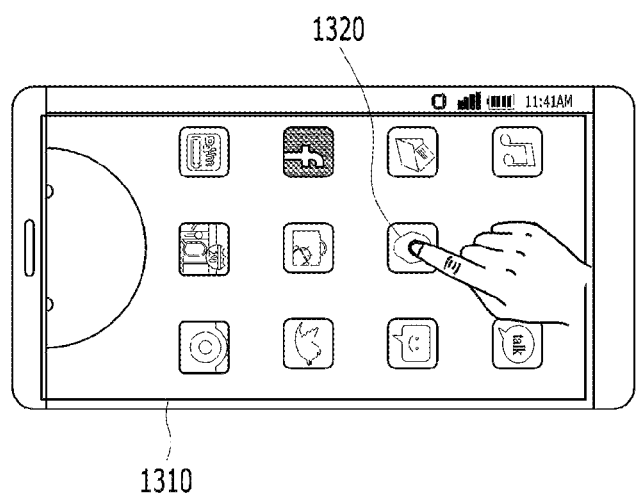
(a)
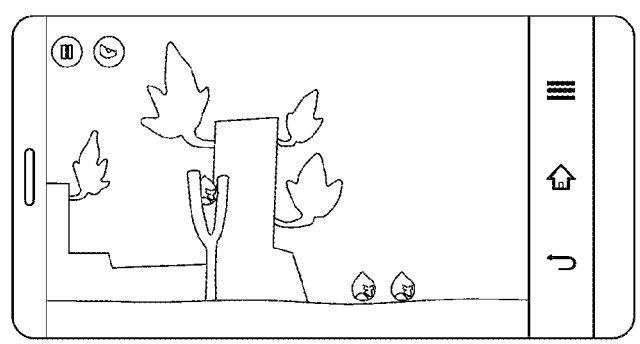
(b)

FIG. 17
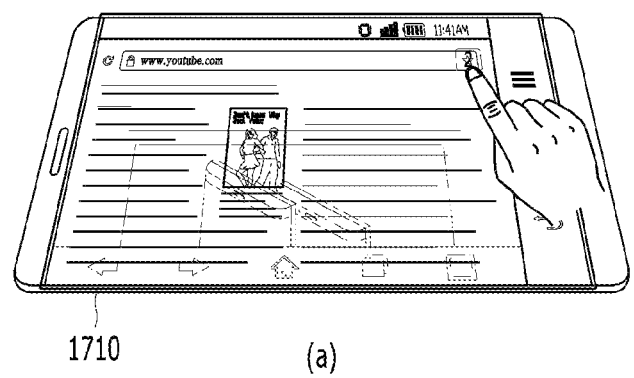
1710   (a)
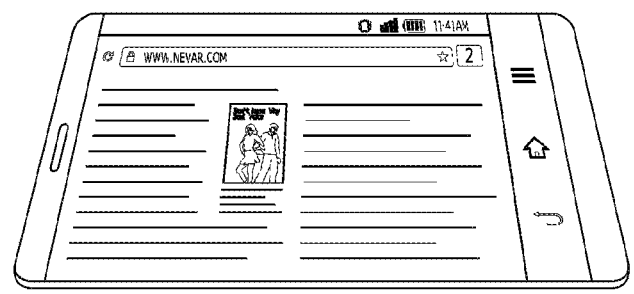
(b)

MOBILE TERMINAL AND CONTROLLING METHOD THEREOF

Pursuant to 35 U.S.C. §119(a), this application claims the benefit of earlier filing date and right of priority to Korean Application No. 10-2014-0157275, filed on Nov. 12, 2014, the contents of which are hereby incorporated by reference herein in their entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for executing at least two or more applications and facilitating the currently executed applications to be switched to each other.

Discussion of the Related Art

Generally, terminals can be classified into mobile/portable terminals and stationary terminals. The mobile terminals can be further classified into handheld terminals and vehicle mount terminals according to possibility of user's direct portability.

As functions of the terminal are getting diversified, the terminal tends to be implemented as a multimedia player provided with composite functions such as photographing of photos or videos, playback of music or video files, game play, broadcast reception and the like for example.

To support and increase the terminal functions, it may be able to consider the improvement of structural parts and/or software parts of the terminal.

Recently, at least two or more applications can be simultaneously executed owing to the performance improvement of a mobile terminal, and some of the simultaneously executed application may be run in window mode instead of being displayed on a full screen.

However, in case of executing a plurality of applications simultaneously, a execution screen of one application blocks another application to cause inconvenience to a user. And, it may cause a problem that an application should support a window mode. On the other hand, when one application is executed as a full screen, in order to switch the application run as the full screen to another application sun as a background, a separate background application list is paged and then the switching is performed inconveniently.

SUMMARY OF THE INVENTION

Accordingly, the present invention is directed to a mobile terminal and controlling method thereof that substantially obviate one or more of the problems due to limitations and disadvantages of the related art.

One object of the present invention is to provide a mobile terminal and controlling method thereof, by which an application-to-application switching is facilitated in the course of simultaneously executing a plurality of applications.

Particularly, the object of the present invention is to provide a mobile terminal and controlling method thereof, by which a state of an application currently run as a background can be checked or switched through a relatively simple operation.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the present invention, as embodied and broadly described, a method of controlling a mobile terminal involves executing a first function; executing a second function and displaying an execution screen associated with the second function on a touchscreen. The method further involves determining whether the mobile terminal has been tilted by an amount that exceeds a first threshold, and when it is determined that the mobile terminal has been tilted by an amount that exceeds the first threshold, displaying the execution screen associated with the second function and an execution screen associated with the first function; determining whether a touch input to the touchscreen occurs while the execution screen associated with the second function and the execution screen associated with the first function are displayed; and displaying the execution screen associated with the first function when it is determined that the touch input has occurred.

To further achieve these and other advantages and in accordance with the purpose of the present invention, as embodied and broadly described, a mobile terminal comprises a touchscreen; a motion sensor configured to detect an amount of tilting of the mobile terminal; and a controller, wherein the controller configured to execute a first function; execute a second function and display an execution screen associated with the second function on a touchscreen. The controller is further configured to determine, based on a signal from the motion sensor, whether the mobile terminal has been tilted by an amount that exceeds a first threshold; display the execution screen associated with the second function and an execution screen associated with the first function, when it is determined that the mobile terminal has been tilted by an amount that exceeds the first threshold, determine whether a touch input to the touchscreen occurs while the execution screen associated with the second function and the execution screen associated with the first function are displayed; and display the execution screen associated with the first function when it is determined that the touch input has occurred.

Accordingly, the present invention provides the following effects and/or features.

First of all, according to the present invention, a plurality of applications can be switched to one another more conveniently.

Particularly, according to the present invention, an application currently executed as a background can be conveniently checked and switched in a manner of tilting the mobile terminal.

Secondly, according to the present invention, since applications run by multitasking operate on the basis of a full screen mode, a special function is not required for an application, whereby the present invention is non-limited by a type of the application.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. The above and other aspects, features, and advantages of the present invention will become more apparent upon consideration of the following description of preferred embodiments, taken in conjunction with the accompanying drawing figures.

In the drawings:

FIG. 2 is a flowchart for one example of a process for switching a plurality of currently run functions to one another through a detection of tilting in a mobile terminal according to one embodiment of the present invention;

FIG. 3 is a diagram for one example of a process for executing a plurality of applications in a mobile terminal according to one embodiment of the present invention;

FIG. 10 is a diagram for one example of a process for switching to a $1^{st}$ function in a situation of displaying a visual effect in response to a tilting in a mobile terminal according to one embodiment of the present invention;

FIG. 12 is a diagram for one example of a process for switching a execution screen to an application list in response to a tilting in case of a non-presence of an application run as a background in a mobile terminal according to one embodiment of the present invention;

FIG. 13 is a diagram for one example of a process for executing a new application in an application list in a situation of displaying a visual effect in response to a tilting in a mobile terminal according to one embodiment of the present invention;

FIG. 17 is a diagram for one example of a process for switching a tab in a situation of displaying a visual effect in response to a tilting in a mobile terminal according to one embodiment of the present invention;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
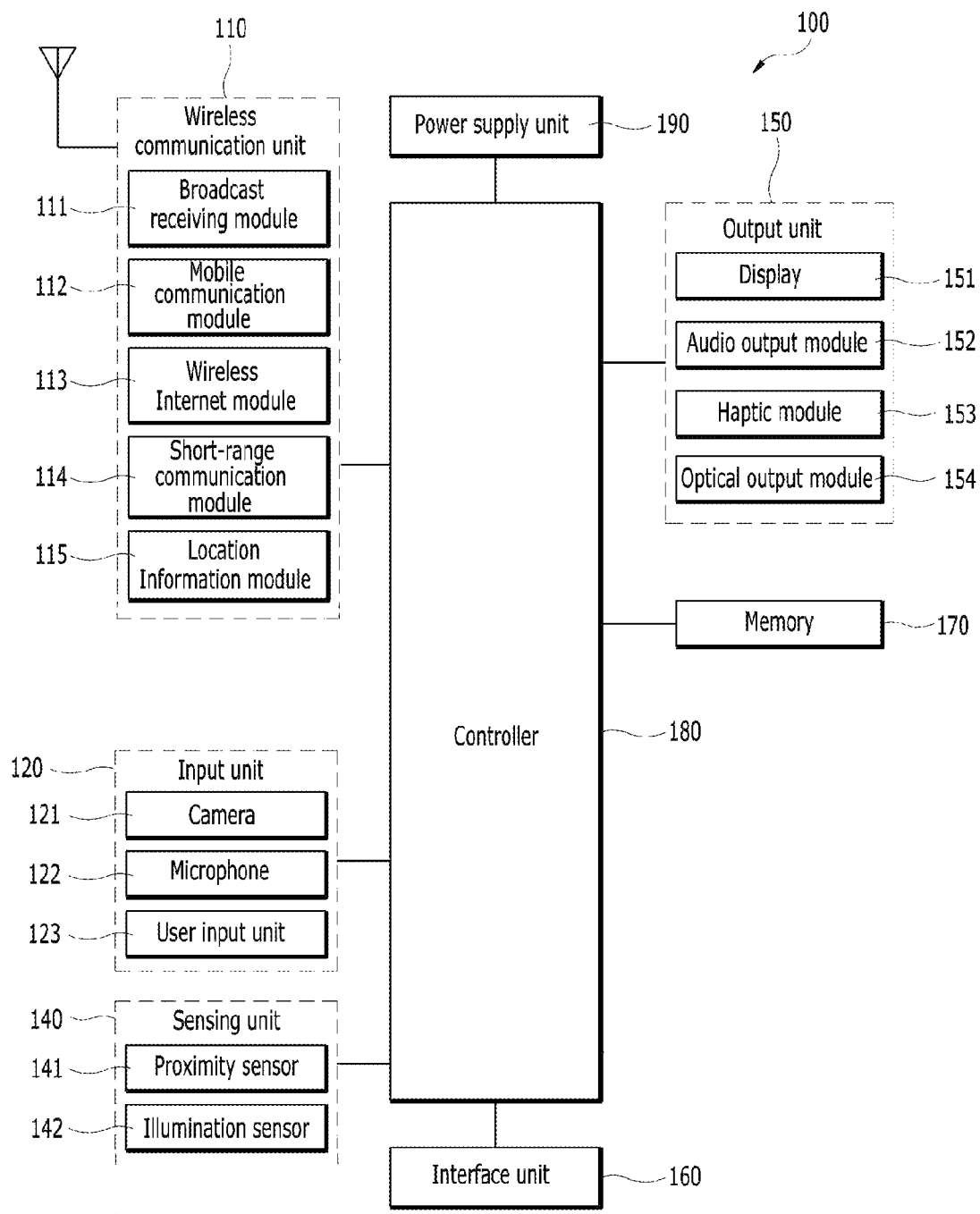
FIG. 1A is a block diagram to describe a mobile terminal in association with the present invention.
Figure 1B:
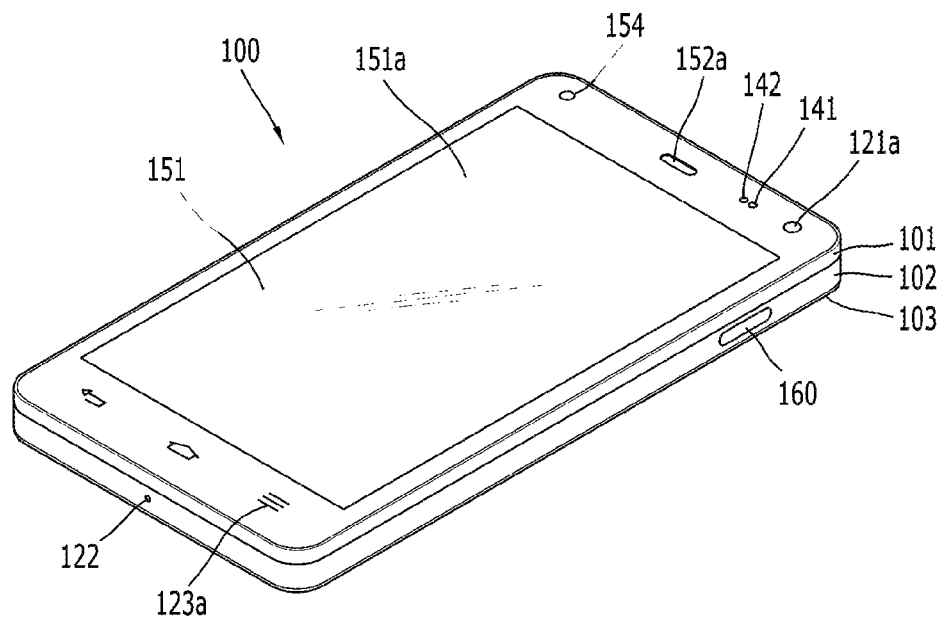
FIG. 1B and FIG. 1C are conceptional diagrams for one example of a mobile terminal in association with the present invention in different views.
Figure 1C:
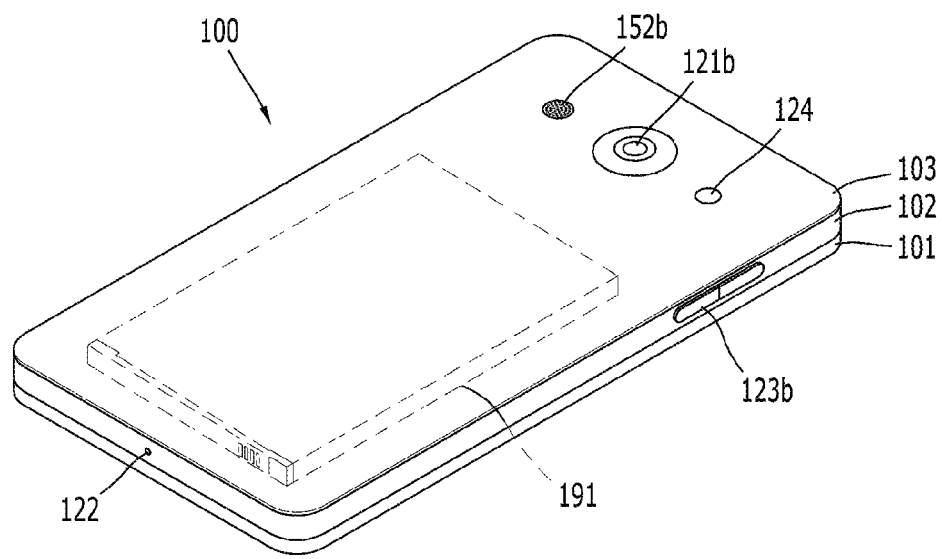

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

According to the present invention, various functions are provided through linked operations between a mobile terminal and a wearable device. Therefore, a configuration of a watch type wearable device is described as one example of a wearable device to which the present invention is applicable.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1-2B according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 2A and 2B depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Simultaneous Execution of Applications by Multitasking & Switching by Tilting

According to one embodiment of the present invention, the following process in a mobile terminal is proposed. First of all, currently executed functions are checked through a multitasking function. Secondly, the functions are switched to one another in a manner that a tilting motion is recognized using a sensor (e.g., an acceleration sensor, a gyro sensor, etc.).

To this end, according to the present invention, the controller 180 memorizes a direction, which is detected through a motion sensor, of the mobile terminal in a 3-dimensional (3D) space at a timing point of starting a multitasking as a default state (or a stable state). The controller 180 controls a execution screen of another function to be displayed in response to a tilting over a predetermined size against the default state. If the direction returns to the default state, a execution screen of a function displayed in the default state can be displayed. Moreover, as a tilting is detected, while a execution screen of another function is displayed, if a command of a prescribed type is inputted, a function run in a default state (i.e., as a foreground) is switched to a background and another function corresponding to the displayed execution screen can be run as a foreground. In this case, 'run as a background' may mean a state that a execution image of a function is not displayed despite that the corresponding function is currently run. And, 'run as a foreground' may mean a state that a function is currently run while a execution image of the corresponding function is displayed. Moreover, 'run as a background' may inclusively mean a state that a executing of a corresponding function is interrupted.

The above-explained operation is described in detail with reference to FIG. 2 as follows.

FIG. 2 is a flowchart for one example of a process for switching a plurality of currently run functions to one another through a detection of tilting in a mobile terminal according to one embodiment of the present invention.

Referring to FIG. 2, at least one $1^{st}$ function can be executed in the first place [S210]. Subsequently, a $2^{nd}$ function can be executed [S220]. In this case, the at least one $1^{st}$ function means at least one function starting to operate as background in response to executing the $2^{nd}$ function. In particular, the $1^{st}$ function and the $2^{nd}$ function are just distinguished from each other depending on the order of the incident but are not distinguished from each other depending on a difference in category or technical features of function. A execution screen of one of the at least one or more $1^{st}$ functions may be displayed through the touchscreen 151 until the $2^{nd}$ function is run. All of the at least one or more $1^{st}$ function may have been run as background already. 'Run the $2^{nd}$ function' may mean that the $2^{nd}$ function is initially run in response to a selection of an indicator or icon corresponding to the $2^{nd}$ function in a situation that the $2^{nd}$ function is not currently run. Alternatively, 'run the $2^{nd}$ function' may mean that the $2^{nd}$ function is switched to be run as foreground by a prescribed procedure in the course of being run as background. Each function may mean an application or a prescribed classification unit (e.g., tab, folder, multimedia file, etc.). A home screen or an application list (e.g., app drawer, etc.) may be included as one function of the present invention.

As the $2^{nd}$ function is run (or switched), it is able to display a execution screen of the $2^{nd}$ function on the touchscreen 151 [S230].

In doing so, the controller 180 can set a disposed state (i.e., a direction, an angle against a ground surface, an angle against a horizontal line, an angle against a rotational axis of the Earth, etc.) of the mobile terminal, which is detected through a motion sensor while the execution screen of the $2^{nd}$ function is displayed on the touchscreen 151, to a default state. In this case, if a state that a motion of the mobile terminal stays within a predetermined range continues over a prescribed time, the controller 180 can set a corresponding disposed state to a default state.

While the above state is maintained, a user can tilt the mobile terminal in order to check an application operating as background or to run the corresponding application as foreground. Hence, the controller 180 can detect a tilted degree of the mobile terminal with reference to the default state through the motion sensor. If the detected tilting exceeds a preset threshold [S240], the controller 180 can control the execution screen of the $2^{nd}$ function to get transparent gradually or not to be displayed, in response to the degree of the tilting. In this case, the tilting may include at least one of a length-directional (i.e., vertical) tilting, a width-directional (i.e., horizontal) tilting, a corner-directional (i.e., diagonal) tilting of the mobile terminal. As the execution screen of the $2^{nd}$ function gets transparent gradually, the execution screen of the at least one $1^{st}$ function may be displayed in a manner of overlaying the execution screen of the $2^{nd}$ function [S250]. For instance, it the mobile terminal is tilted at about 30 degrees, the execution screen of the $2^{nd}$ function is displayed in a manner of being blurred as soon as the execution screen of the $1^{st}$ function starts to get semitransparent. If the mobile terminal is titled at about 45 degrees, the execution screen of the $1^{st}$ function and the execution screen of the $2^{nd}$ function may be displayed with similar semi-transparency in a manner of overlaying each other. If the mobile terminal is tilted at about 60 degrees, the execution screen of the $1^{st}$ function can be displayed in a manner of being clearer than the execution screen of the $2^{nd}$ function. Alternatively, the function of giving the gradual transparency may be skipped. If the tilting exceeds a threshold, the execution screen of the $1^{st}$ function can be displayed in direct. On the other hand, while the tilting over the threshold is detected, if each function is accompanied by an audio output, the controller 180 may control audios of the two function to be outputted simultaneously or may control an audio, which corresponding to a relatively clear display function, to be outputted only. Moreover, if a plurality of $1^{st}$ functions exist, execution screens corresponding to the $1^{st}$ functions differing from each other can be sequentially displayed in response to the degree of the tilting.

In some cases, although the degree of the tilting does not exceed the threshold, if the mobile terminal is placed in a specific posture (e.g., if the mobile terminal is located to be in parallel with a ground surface in a manner of being placed on a desk, a floor or the like), it may bring an effect as if the tilting exceeds the threshold.

While the execution screen of the at least one $1^{st}$ function is displayed, if a command of a prescribed type is inputted [S260], the execution screen of either the at least one $1^{st}$ function or the $2^{nd}$ function, which corresponds to the inputted command, can be displayed [S270].

In this case, the command of the prescribed type may include one of a general contact touch input, a touch-drag input in a specific direction, a case of maintaining a tilted state over a prescribed time, and the like. A relation of correspondence to a function selected per command shall be described in detail later.

According to the description with reference to FIG. 2, as the execution screen of the $2^{nd}$ function gets transparent gradually in response to the tilting after executing the $2^{nd}$ function, the $1^{st}$ function gradually appears from a bottom side, by which the present invention is non-limited. For instance, as the execution screen of the $2^{nd}$ function gets transparent, it is not mandatory for the execution screen of the $1^{st}$ function to appear as if projected under the execution screen of the $2^{nd}$ function. For instance, while the execution screen of the $2^{nd}$ function is displayed, if a titling is detected, the execution screen of the $2^{nd}$ function remains intact but the execution screen of the $1^{st}$ function may be displayed in a manner of covering to block the execution screen of the $2^{nd}$ function by getting gradually non-transparent (i.e., the execution screen of the $1^{st}$ function seems to appear over the execution screen of the $2^{nd}$ function).

How to run a $1^{st}$ function and a $2^{nd}$ function (i.e., a process for executing a $1^{st}$ function and a $2^{nd}$ function) is described as follows. In the following description, the $1^{st}$ function and the $2^{nd}$ function are different applications unless mentioned specially.

In general, if a user touches an icon corresponding to an application desired to be executed on a home screen or an application list, the corresponding application can be executed in a mobile terminal. While the application is run, a plurality of applications can be executed in a manner of paging the home screen, the application list, or a multitasking list again by manipulating a home key button or the like and then selecting other icons from the home screen, the application list, or the multitasking list. In doing so, the last run application becomes the $2^{nd}$ application of the present invention and the rest of the applications become the at least one or more $1^{st}$ applications. How to run a plurality of applications by other methods are described in detail with reference to FIG. 3 and FIG. 4 as follows.

FIG. 3 is a diagram for one example of a process for executing a plurality of applications in a mobile terminal according to one embodiment of the present invention.

Referring to FIG. 3, a web browser is run through the touchscreen 151 of the mobile terminal [FIG. 3 (a)]. In doing so, while a user touches a random point on the touchscreen 151, if the user tilts the mobile terminal [FIG. 3 (b)] and then applies a drag in a prescribed edge direction (e.g., a top direction) of the touchscreen 151 [FIG. 3 (c)], as the web browser is switched to a background and a home screen can be displayed [FIG. 3 (d)]. Subsequently, if the user touches an icon 310 corresponding to an application desired to be executed on a home screen, the corresponding application can be executed.

Figure 4:
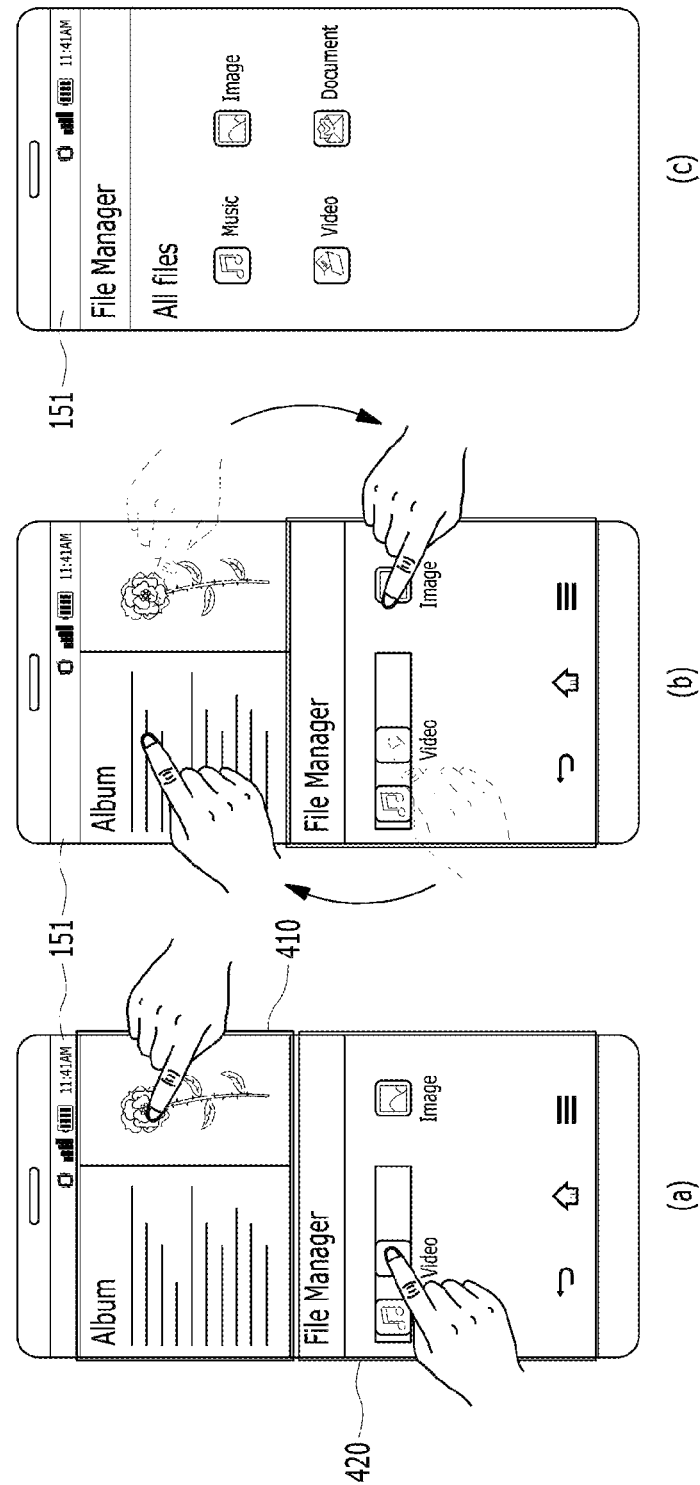
FIG. 4 is a diagram for another example of a process for executing a plurality of applications in a mobile terminal according to one embodiment of the present invention.

FIG. 4 is a diagram for another example of a process for executing a plurality of applications in a mobile terminal according to one embodiment of the present invention.

Referring to FIG. 4, execution screens 410 and 420 of two applications supportive of a window mode are displayed on split screens of the touchscreen 151, respectively [FIG. 4 (a)]. In doing so, if a user contacts the execution screens with different pointers, respectively and then drags each of the pointers to the other execution screen [FIG. 4 (b)], the application corresponding to the execution screen 410 used to be displayed on the top side is switched to a background and the application corresponding to the execution screen 420 used to be displayed on the bottom side can be run as a full screen.

Figure 5:
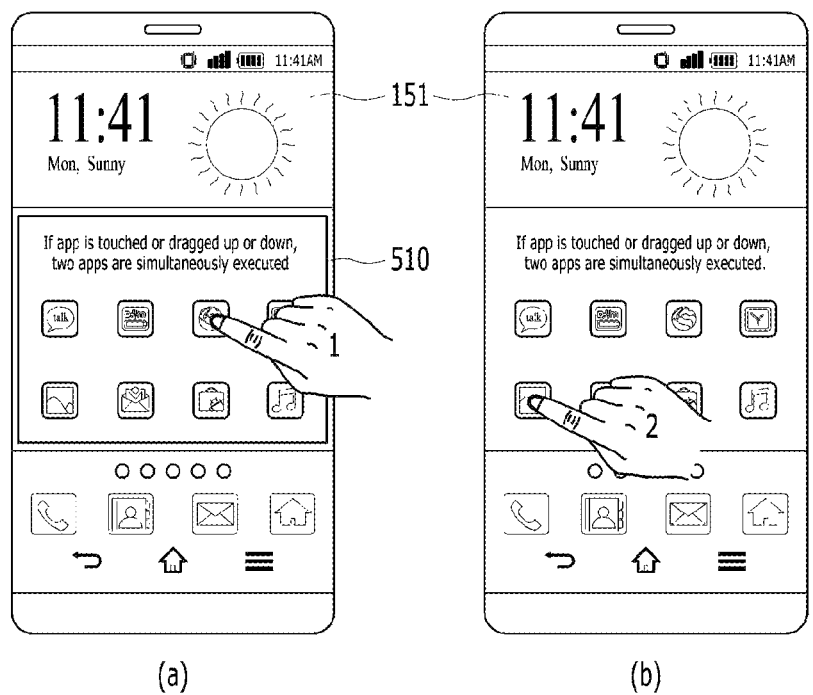
FIG. 5 is a diagram for further example of a process for executing a plurality of applications in a mobile terminal according to one embodiment of the present invention.

FIG. 5 is a diagram for further example of a process for executing a plurality of applications in a mobile terminal according to one embodiment of the present invention.

Referring to FIG. 5, while an application list 510 of simultaneously runnable applications is paged, a prescribed application is selected from the application list 510 [FIG. 5 (*a*)]. Subsequently, if another application is selected [FIG. 5 (*b*)], the two selected applications can be simultaneously run. In doing so, the early selected application can be run as a background and the later selected application can be run as a foreground. Alternatively, in a manner similar to that shown in FIG. 4, the execution screens of the two applications can be simultaneously displayed through split screens.

When one of two applications is run as a background and the other is run as a foreground, an application-to-application switching method is described in detail with reference to FIGS. 6 to 11 as follows.

Figure 6:
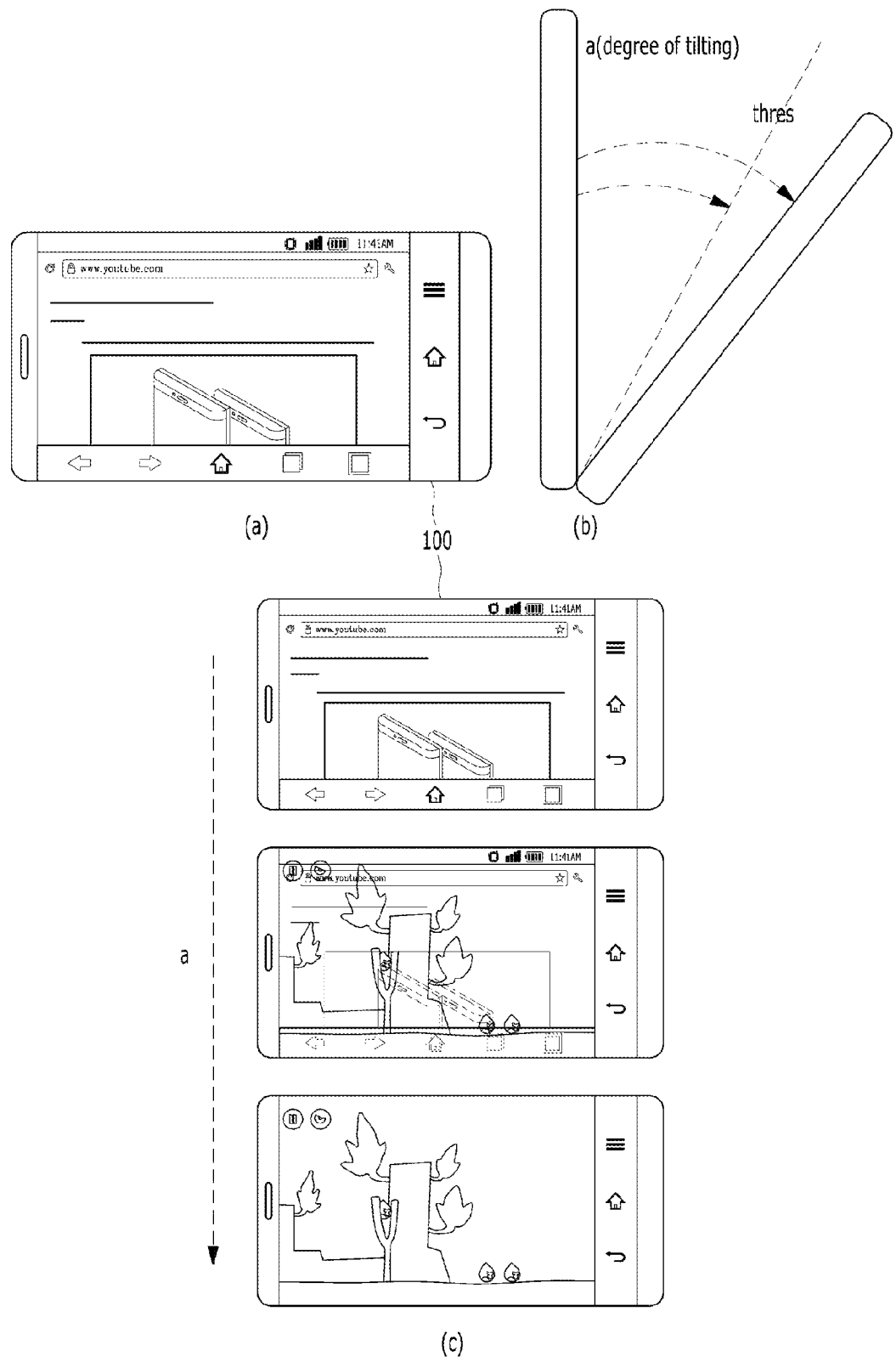
FIG. 6 is a diagram for one example of a process for switching a execution screen between a $1^{st}$ function and a $2^{nd}$ function in response to a tilting in a mobile terminal according to one embodiment of the present invention.

FIG. 6 is a diagram for one example of a process for switching a execution screen between a $1^{st}$ function and a $2^{nd}$ function in response to a tilting in a mobile terminal according to one embodiment of the present invention.

In FIG. 6, assume a case that a web browser application is run (or switched) after executing a game application.

Referring to FIG. 6, as the web browser application is run (switched), a execution screen of the web browser application is displayed [FIG. 6 (*a*)]. In doing so, when a degree a of a tilting exceeds a threshold (thres) [FIG. 6 (*b*)], if the degree a of the tilting increase higher, the execution screen of the web browser application gets more transparent so that a execution screen of the game application can be displayed by getting clearer [FIG. 6 (*c*)]. According to the situation shown in a middle diagram of FIG. 6 (*c*), as similar transparencies are given to the execution screens of the two applications, respectively, the two execution screens are displayed in a manner of overlaying each other semi-transparently.

Figure 7:
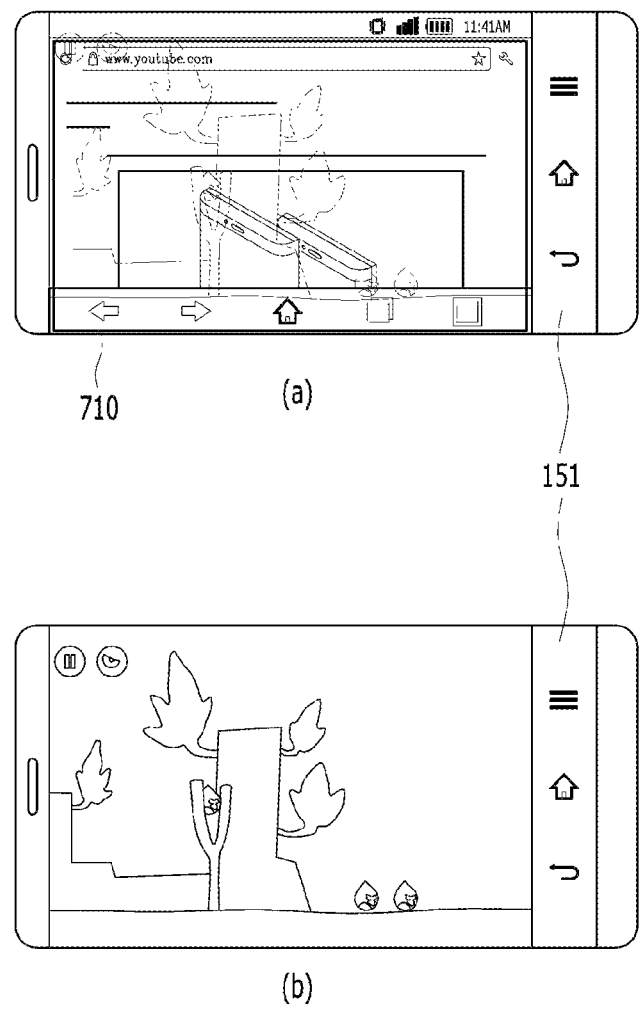
FIG. 7 is a diagram for one example of a process for switching to a $1^{st}$ function in a situation of displaying a visual effect in response to a tilting in a mobile terminal according to one embodiment of the present invention.

FIG. 7 is a diagram for one example of a process for switching to a $1^{st}$ function in a situation of displaying a visual effect in response to a tilting in a mobile terminal according to one embodiment of the present invention.

Referring to FIG. 7 (*a*), if a degree of a tilting exceeds a preset degree (or if a execution screen of a $1^{st}$ function is displayed clearly), a prescribed visual effect can be displayed on the touchscreen 151. For instance, a prescribed visual effect 710 can be displayed on an edge of a corresponding execution screen. In doing so, the visual effect may be displayed in a manner that an outline effect of a specific color is continuously displayed or in a manner of blinking. In case that the visual effect is the blinking effect, a user can be visually informed of a flow of a time for maintaining a degree of a corresponding tilting by changing a period of the blinking. In doing so, the prescribed visual effect 710 may be displayed on the execution screen of the $1^{st}$ function, a execution screen of a $2^{nd}$ function, or a layer separate from the execution screen of each of the $1^{st}$ function and the $2^{nd}$ function. Moreover, the prescribed visual effect may be substituted with a corresponding icon display or the like.

While the visual effect is displayed, if a touch input to the touchscreen 151 is detected or a prescribed time elapses after the display of the visual effect, referring to FIG. 7 (*b*), an application used to be run as a background is switched to a foreground and its execution screen can be displayed. On the other hand, while the visual effect is displayed, if a touch input to the touchscreen 151 is detected or a prescribed time elapses after the display of the visual effect, it is a matter of course that a execution screen of a previously displayed web browser application can be displayed again.

While the visual effect is displayed, if a touch input without a drag is detected from the touchscreen 151, the visual effect disappears, the application used to be run as the background shown in FIG. 7 (*b*) is switched to a foreground, and its execution screen can be displayed. While the visual effect is displayed, if a drag input in continuation with a touch input to the touchscreen 151 is detected, the visual effect disappears and the application run as the foreground can continue to be displayed without displaying the application used to be run as the background.

Figure 8:
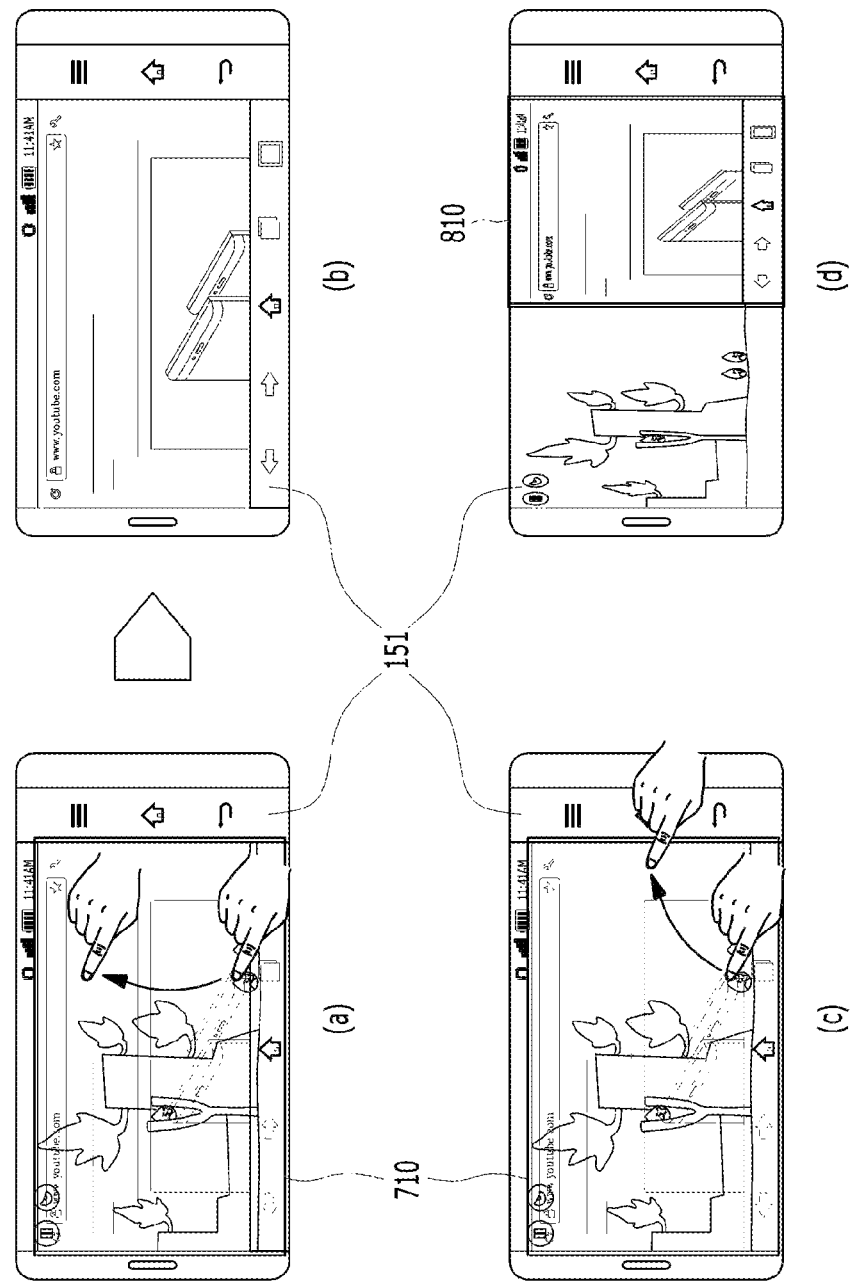
FIG. 8 is a diagram for one example of a process for switching a function in response to a direction of a touch drag input in a situation of displaying a visual effect in response to a tilting in a mobile terminal according to one embodiment of the present invention.

FIG. 8 is a diagram for one example of a process for switching a function in response to a direction of a touch drag input in a situation of displaying a visual effect in response to a tilting in a mobile terminal according to one embodiment of the present invention.

Referring to FIG. 8, when a visual effect 710 is displayed, if a touch-drag input in a vertical direction is detected [FIG. 8 (*a*)], the controller 180 can control a execution screen of a previously displayed web browser application to be displayed again [FIG. 8 (*b*)].

On the other hand, when a visual effect 710 is displayed, if a touch-drag input in a horizontal direction is detected [FIG. 8 (*c*)], the controller 180 controls an application used to be run as a background to be switched to a foreground, controls a execution screen of the switched application to be displayed, and controls a execution screen 810 of the previously displayed web browser application to be displayed in window mode [FIG. 8 (*d*)]. In some cases, it is a matter of course that the controller 180 can control both of the execution screens of the two applications to be displayed in window mode through split screens.

On the other hand, instead of giving transparency, a execution screen of an application operating as a background can be displayed in a manner of gradually sliding. This is described in detail with reference to FIGS. 9 to 11 as follows.

Figure 9:
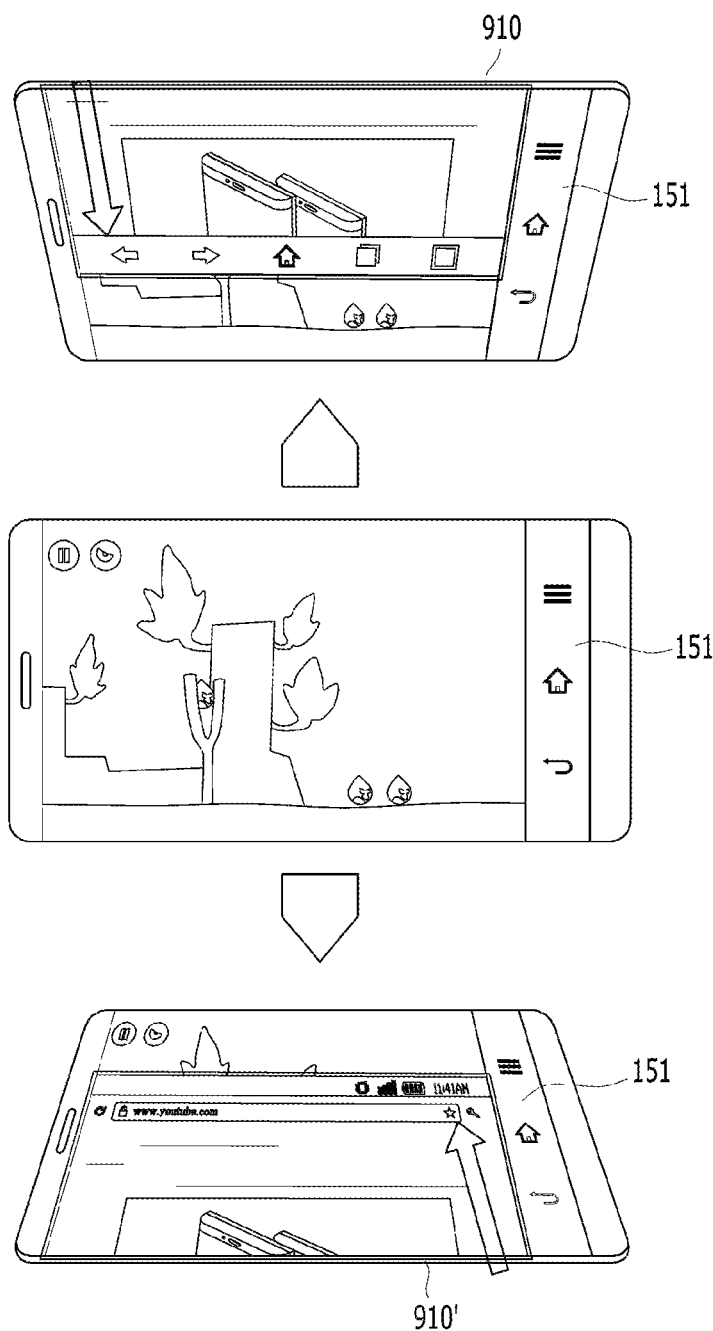
FIG. 9 is a diagram for one example of a process for sliding to display a execution screen of an application operating as a background in response to a tilting in a mobile terminal according to one embodiment of the present invention.

FIG. 9 is a diagram for one example of a process for sliding to display a execution screen of an application operating as a background in response to a tilting in a mobile terminal according to one embodiment of the present invention.

Figure 11:
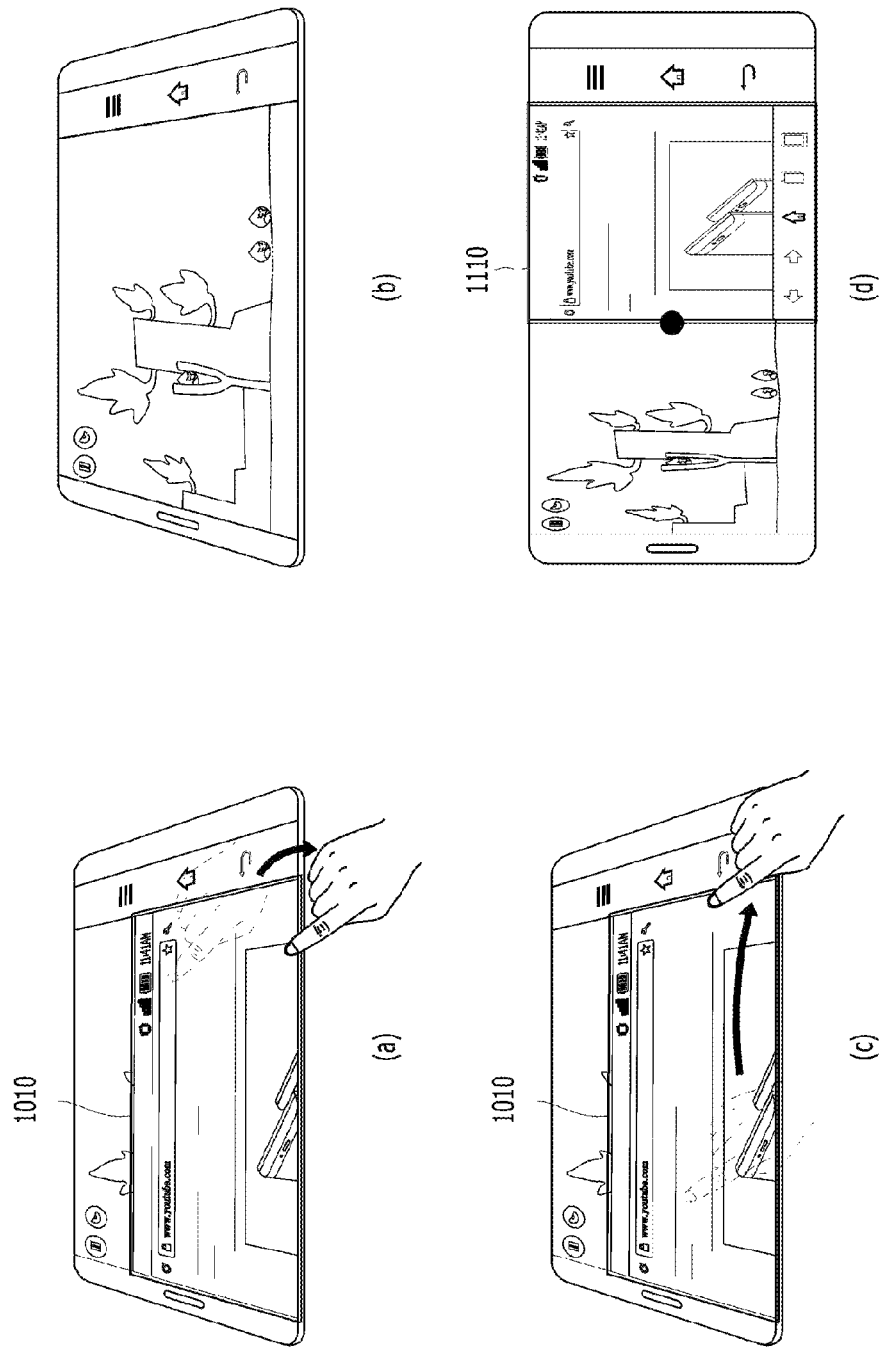
FIG. 11 is a diagram for one example of a process for switching a function in response to a direction of a touch drag input in a situation of displaying a visual effect in response to a tilting in a mobile terminal according to one embodiment of the present invention.

In FIGS. 9 to 11, assume a situation that a web browser application is run as a background while a game application is run as a foreground.

Referring to FIG. 9, when a execution screen of a game allocation is displayed like the middle diagram shown in FIG. 9, if an upper part of the mobile terminal is tilted to get closer to a user, a execution screen 910 of a web browser application currently run as a background slides in from an upper side in response to a degree of the tilting. On the other hand, if a lower part of the mobile terminal is tilted to get closer to a user, a execution screen 910' of the web browser application currently run as the background slides in from a lower side in response to a degree of the tilting.

FIG. 10 is a diagram for one example of a process for switching to a $1^{st}$ function in a situation of displaying a visual effect in response to a tilting in a mobile terminal according to one embodiment of the present invention.

Referring to FIG. 10 (*a*), if a degree of a tilting exceeds a preset degree (or, if a execution screen of a $1^{st}$ function slides in to the end of an upper side), a prescribed visual effect appears on the touchscreen. For instance, a prescribed visual effect 1010 can be displayed on an edge of the corresponding execution screen. In doing so, the visual effect may be displayed in a manner that an outline effect of a specific color is continuously displayed or in a manner of blinking. In case that the visual effect is the blinking effect, a user can be visually informed of a flow of a time for maintaining a degree of a corresponding tilting by changing a period of the blinking. In doing so, the prescribed visual effect 1010 may be displayed on the execution screen of the $1^{st}$ function, a execution screen of a $2^{nd}$ function, or a layer separate from the execution screen of each of the $1^{st}$ function and the $2^{nd}$ function. Moreover, the prescribed visual effect may be substituted with a corresponding icon display or the like.

While the visual effect is displayed, if a touch input to the touchscreen 151 is detected or a prescribed time elapses after the display of the visual effect [FIG. 10 (b)], an application used to be run as a background is switched to a foreground and its execution screen can be displayed [FIG. 10 (c)]. On the other hand, while the visual effect is displayed, if a touch input to the touchscreen 151 is detected or a prescribed time elapses after the display of the visual effect, it is a matter of course that the execution screen of the previously displayed web browser application can be displayed again.

FIG. 11 is a diagram for one example of a process for switching a function in response to a direction of a touch drag input in a situation of displaying a visual effect in response to a tilting in a mobile terminal according to one embodiment of the present invention.

Referring to FIG. 11, when a visual effect 1010 is displayed, if a touch-drag input in a direction opposite to a slide-in direction is detected [FIG. 11 (a)], a execution screen of an application operating as a background slides out so that a execution screen of a previously displayed game application can be displayed again [FIG. 11 (b)].

When the visual effect 1010 is displayed, if a touch-drag input in a horizontal direction is detected [FIG. 11 (c)], the controller 180 may control a execution screen 1110 of an application previously run as a background to be displayed in window mode [FIG. 11 (d)]. In doing so, if the touch-drag input is detected in a left direction, the controller 180 may control the execution screen of the application previously run as the background to be displayed on a left window of the window mode and may control a previously displayed execution screen of a game application to be displayed on a right window of the window mode. On the other hand, if the touch-drag input is detected in a right direction, the controller 180 may control the execution screen of the application previously run as the background to be displayed on the right window of the window mode and may control a previously displayed execution screen of a game application to be displayed on the left window of the window mode. In some cases, it is a matter of course that the controller 180 can control both of the execution screens of the two applications to be displayed in the window mode through split screens.

A process for switching a function in case of a non-presence of an application currently operating as a background is displayed in detail with reference to FIGS. 12 to 14 as follows.

FIG. 12 is a diagram for one example of a process for switching a execution screen to an application list in response to a tilting in case of a non-presence of an application run as a background in a mobile terminal according to one embodiment of the present invention.

Referring to FIG. 12, as a web browser application is run, a execution screen of a web browser application is displayed. While the execution screen of the web browser application is displayed, if a mobile terminal is tilted such that a degree of tilting exceeds a threshold, as the degree of the tilting increases, the execution screen of the web browser application gets more transparent gradually and an application list can be displayed by getting clearer gradually.

In doing so, the application list may be displayed as a full screen, as shown in FIG. 12. Alternatively, the application list may be displayed so as to occupy a partial region of a touchscreen. Moreover, icons of applications may be sorted and displayed on the application list in recently used order or frequently used order. Icons of applications, each of which is displayed if a home button is pressed deep, may be displayed on the application list. An application (e.g., an address book in case of currently executing an SMS application, an instant messenger application, etc.) related to a currently run application may be displayed on the application list. Clipboards for storing copied contents may be displayed on the application list instead of icons of applications. And, a home screen or a main menu (e.g., app drawer) may be displayed on the application list. Of course, the above-mentioned icons or clipboards may be sequentially displayed by the degree of the tilting.

FIG. 13 is a diagram for one example of a process for executing a new application in an application list in a situation of displaying a visual effect in response to a tilting in a mobile terminal according to one embodiment of the present invention.

Referring to FIG. 13 (a), if a degree of a tilting exceeds a preset degree (or if an application list is displayed clearly), a prescribed visual effect is displayed on a touchscreen. For instance, a prescribed visual effect 1310 can be displayed on an edge of the application list. In doing so, the visual effect may be displayed in a manner that an outline effect of a specific color is continuously displayed or in a manner of blinking. In case that the visual effect is the blinking effect, a user can be visually informed of a flow of a time for maintaining a degree of a corresponding tilting by changing a period of the blinking. In doing so, the prescribed visual effect 1310 may be displayed on a execution screen of a $1^{st}$ function, a execution screen of a $2^{nd}$ function, or a layer separate from the execution screen of each of the $1^{st}$ function and the $2^{nd}$ function. Moreover, the prescribed visual effect may be substituted with a corresponding icon display or the like.

While the visual effect is displayed, if a touch input to a random icon 1320 on the application list is detected, referring to FIG. 13 (b), an application corresponding to the selected icon is run and its execution screen can be displayed.

Moreover, if a prescribed time elapses after the display of the visual effect or a region on which an icon is not disposed is touched, a execution screen of a previously displayed application can be displayed again.

Figure 14:
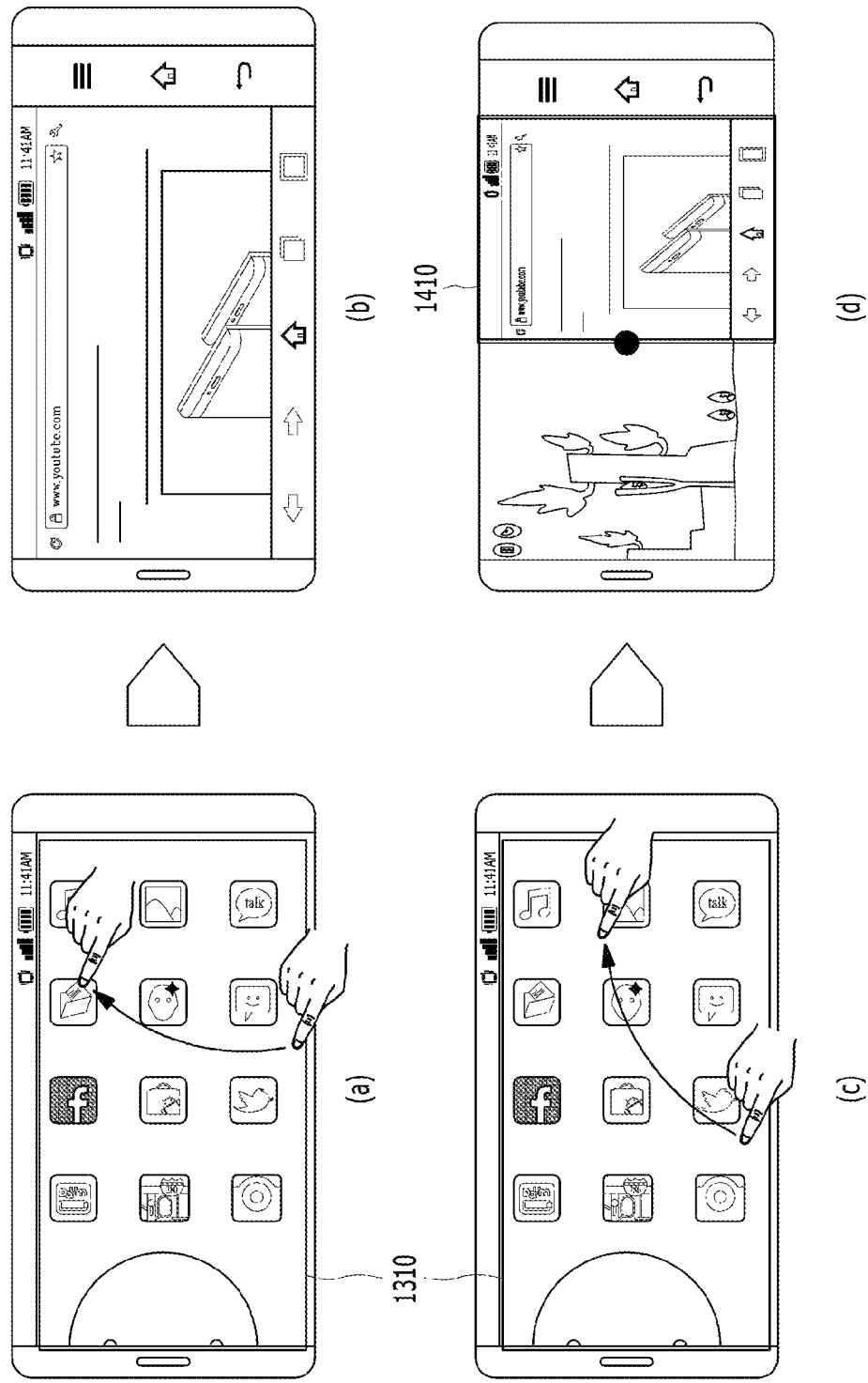
FIG. 14 is a diagram for one example of a process for switching a function in response to a direction of a touch drag input in a situation of displaying a visual effect in response to a tilting in a mobile terminal according to one embodiment of the present invention.

FIG. 14 is a diagram for one example of a process for switching a function in response to a direction of a touch drag input in a situation of displaying a visual effect in response to a tilting in a mobile terminal according to one embodiment of the present invention.

Referring to FIG. 14, when a visual effect 1310 is displayed, if a touch-drag input in a vertical direction is detected [FIG. 14 (a)], the controller 180 can control a execution screen of a previously displayed web browser application to be displayed again [FIG. 14 (b)].

When the visual effect 1310 is displayed, if a touch-drag input starting from a specific icon in a horizontal direction is detected [FIG. 14 (c)], the controller 180 may run an application corresponding to the icon from which the touch-drag input has started and may control a execution screen of the corresponding application to be displayed. In doing so, the controller can control the previously displayed execution screen 1410 of the web browser application to be displayed in window mode [FIG. 14 (*d*)]. In doing so, if the touch-drag input is detected in a left direction, the controller 180 may run the application corresponding to the touch-drag input started icon, may control the execution screen of the corresponding application to be displayed on a left window of the window mode, and may control the previously displayed execution screen 1410 of the web browser application to be displayed on a right window of the window mode. On the other hand, if the touch-drag input is detected in a right direction, the controller 180 may run the application corresponding to the touch-drag input started icon, may control the execution screen of the corresponding application to be displayed on the right window of the window mode, and may control the previously displayed execution screen 1410 of the web browser application to be displayed on the left window of the window mode. In some cases, it is a matter of course that the controller 180 can control both of the execution screens of the two applications to be displayed in the window mode through split screens.

Meanwhile, as mentioned in the foregoing description, functions according to the present invention include a plurality of views or tabs provided by a single application. In particular, the tab is described in detail with reference to FIG. 15 as follows.

Figure 15:
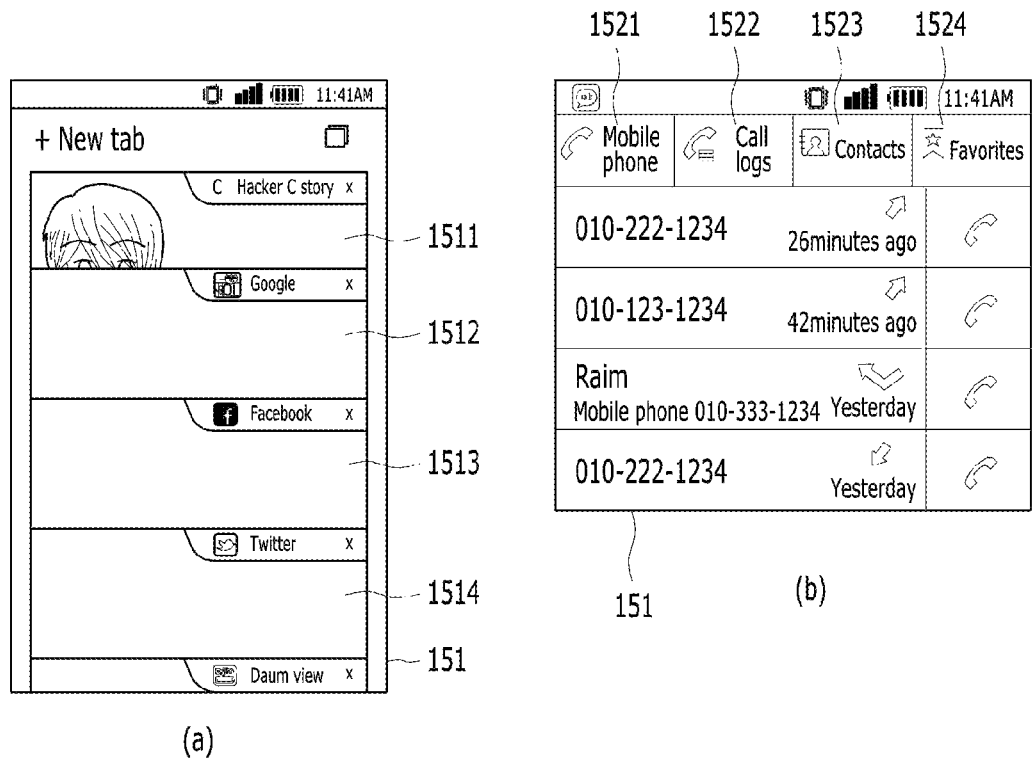
FIG. 15 is a diagram to describe a tab applicable to one embodiment of the present invention.

FIG. 15 is a diagram to describe a tab applicable to one embodiment of the present invention.

Referring to FIG. 15, a recent web browser application uses a tab to provide a plurality of independent web searches. Generally, a single tab is displayed at a time. Yet, if a tab list button is touched, as shown in FIG. 15 (*a*), a plurality of tabs 1511 to 1514 can be displayed in a manner of being stacked up. In doing so, if a specific tab is selected, the corresponding tab can be displayed as a full screen.

Like the example shown in FIG. 15 (*b*), a call related application may provide a tab function. In this case, since a tab is always displayed on a specific region, it may be unnecessary for a tab list to be paged through a separate button. And, tabs 1521 to 1523 may correspond to different functions, respectively.

A case of applying the present embodiment to a tab is described in detail with reference to FIGS. 16 to 18 as follows.

Figure 16:
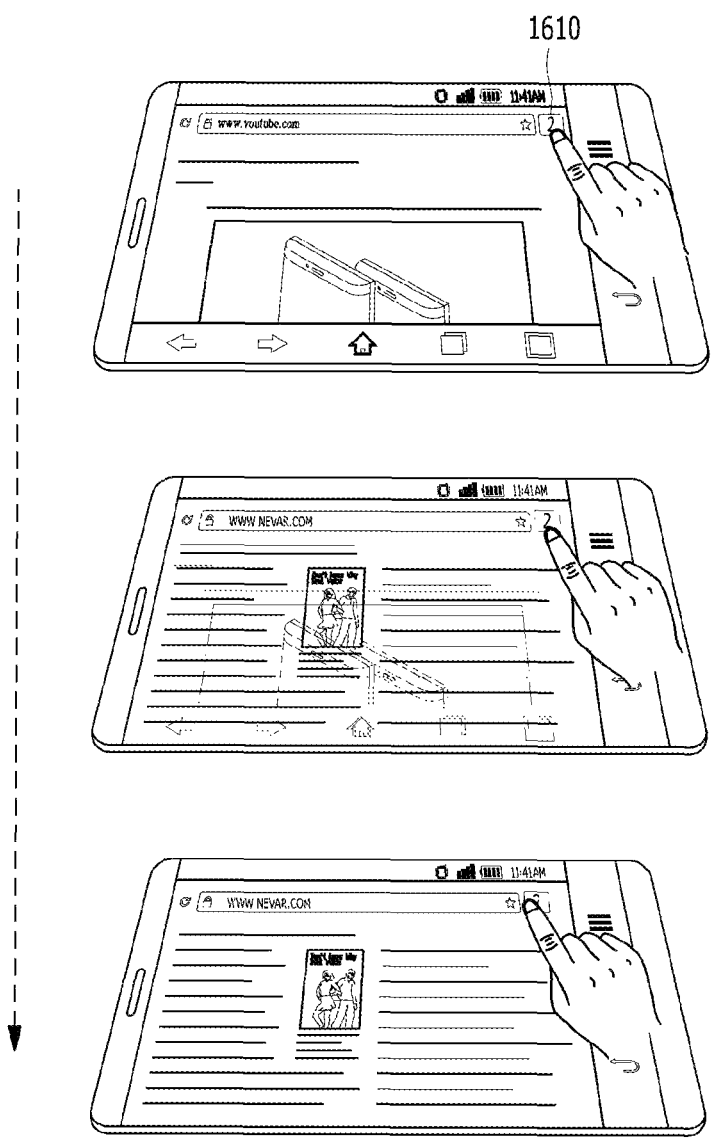
FIG. 16 is a diagram for one example of a process for performing a tab-to-tab switching in response to a tilting in a mobile terminal according to one embodiment of the present invention.

FIG. 16 is a diagram for one example of a process for performing a tab-to-tab switching in response to a tilting in a mobile terminal according to one embodiment of the present invention.

In FIG. 16, assume a case that a user searches a $2^{nd}$ webpage by paging a $2^{nd}$ tab in the course of searching a $1^{st}$ webpage through a $1^{st}$ tab in a web browser application.

Referring to FIG. 16, while the $2^{nd}$ webpage is displayed through the $2^{nd}$ tab, if a mobile terminal is tilted in a manner that a degree of the tilting exceeds a threshold during a touch to a tab list button 1610, as the degree of the tilting increases higher, the $1^{st}$ tab can be displayed in a manner of getting clearer gradually while the $2^{nd}$ tab gets more transparent gradually.

In doing so, the tab-to-tab switching in response to the tilting can be displayed in a manner of a selection in a relative direction of the tabs shown in FIG. 15 (*b*) in accordance with a direction of the tilting with reference to a current tab. For instance, when a currently displayed tab (i.e., $2^{nd}$ tab) is the call log tab 1522 shown in FIG. 15 (*b*), if the titling in a right direction is detected, the controller 180 can control the address book tab 1523 (i.e., $1^{st}$ tab) to be displayed in a manner of getting clearer gradually. On the other hand, if the titling in a left direction is detected, the controller 180 can control the mobile phone tab 1521 (i.e., $1^{st}$ tab) to be displayed in a manner of getting clearer gradually.

In this case, the touch to the tab list button 1610 is provided to be distinguished from the aforementioned application unit switching and may be skipped in some cases.

FIG. 17 is a diagram for one example of a process for switching a tab in a situation of displaying a visual effect in response to a tilting in a mobile terminal according to one embodiment of the present invention.

Referring to FIG. 17 (*a*), if a degree of a tilting exceeds a preset degree (or, if a $1^{st}$ tab is displayed clearly), a prescribed visual effect appears on the touchscreen. For instance, a prescribed visual effect 1710 can be displayed on an edge. In doing so, the visual effect may be displayed in a manner that an outline effect of a specific color is continuously displayed or in a manner of blinking. In case that the visual effect is the blinking effect, a user can be visually informed of a flow of a time for maintaining a degree of a corresponding tilting by changing a period of the blinking. In doing so, the prescribed visual effect 1710 may be displayed on a execution screen of a $1^{st}$ function, a execution screen of a $2^{nd}$ function, or a layer separate from the execution screen of each of the $1^{st}$ function and the $2^{nd}$ function. Moreover, the prescribed visual effect may be substituted with a corresponding icon display or the like.

While the visual effect is displayed, if a touch input to the touchscreen is detected or a prescribed time elapses after the display of the visual effect, referring to FIG. 17 (*b*), the $1^{st}$ tab is activated and a $1^{st}$ webpage of the $1^{st}$ tab can be displayed. On the other hand, while the visual effect is displayed, if a touch input to the touchscreen is detected or a prescribed time elapses after the display of the visual effect, a previously displayed $2^{nd}$ tab can be displayed again.

Figure 18:
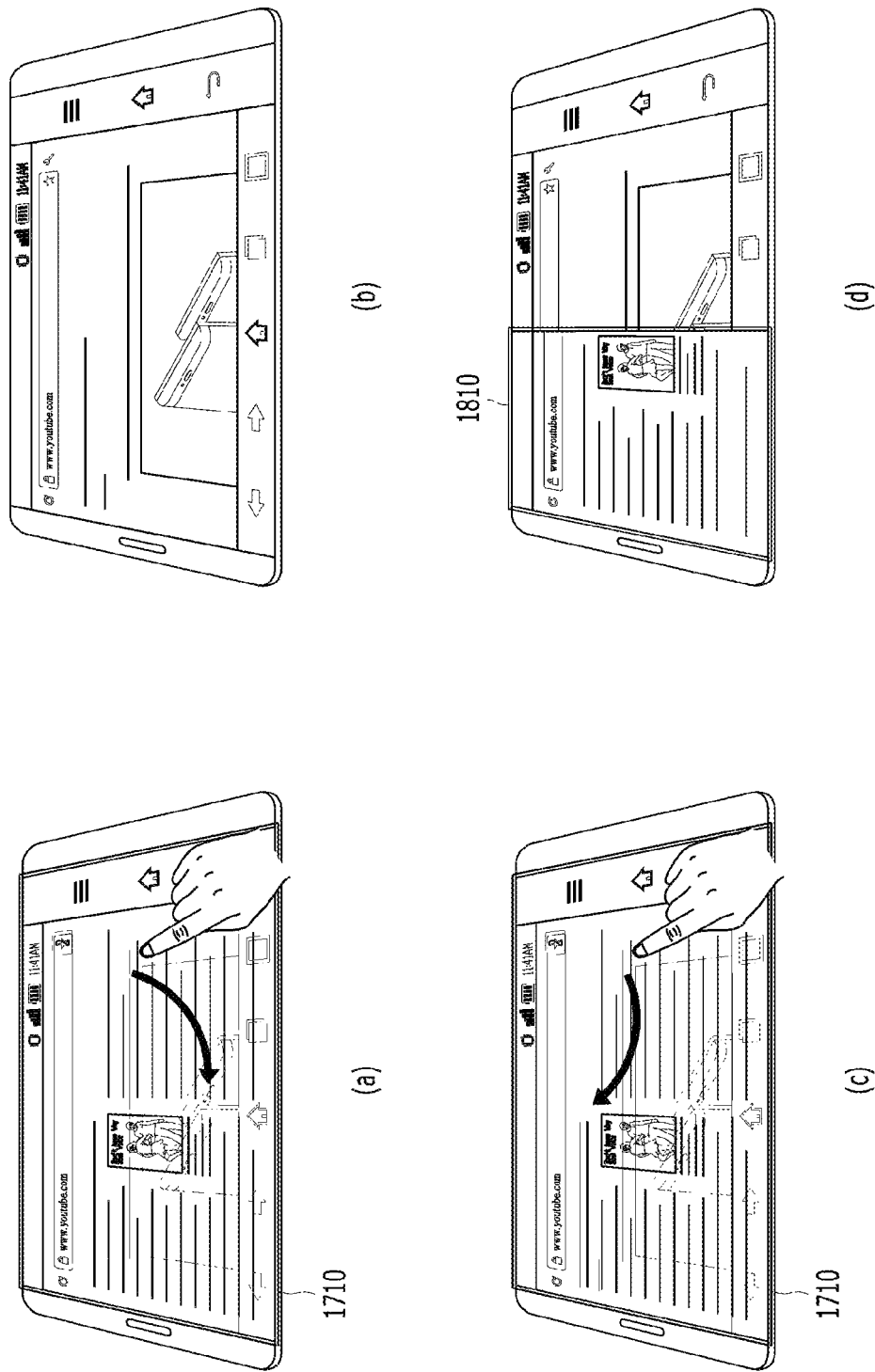
FIG. 18 is a diagram for one example of a tab switching process in response to a direction of a touch drag input in a situation of displaying a visual effect in response to a tilting in a mobile terminal according to one embodiment of the present invention.

FIG. 18 is a diagram for one example of a tab switching process in response to a direction of a touch drag input in a situation of displaying a visual effect in response to a tilting in a mobile terminal according to one embodiment of the present invention.

Referring to FIG. 18, when a visual effect 1710 is displayed, if a touch-drag input in a vertical direction is detected [FIG. 18 (*a*)], the controller 180 can control a previously displayed $2^{nd}$ tab to be displayed again [FIG. 18 (*b*)].

When a visual effect 1710 is displayed, if a touch-drag input in a horizontal direction is detected [FIG. 18 (*c*)], the controller 180 may activate a $1^{st}$ tab and may also control the $2^{nd}$ tab 1810 to be displayed in window mode [FIG. 18 (*d*)]. In some cases, it is a matter of course that the controller 180 can control both of the tabs to be run in the window mode through split screens.

Meanwhile, in case that there are a plurality of functions currently run as background, a function to be switched can be selected in response to a direction of a tilting. This is described in detail with reference to FIG. 19 as follows.

Figure 19:
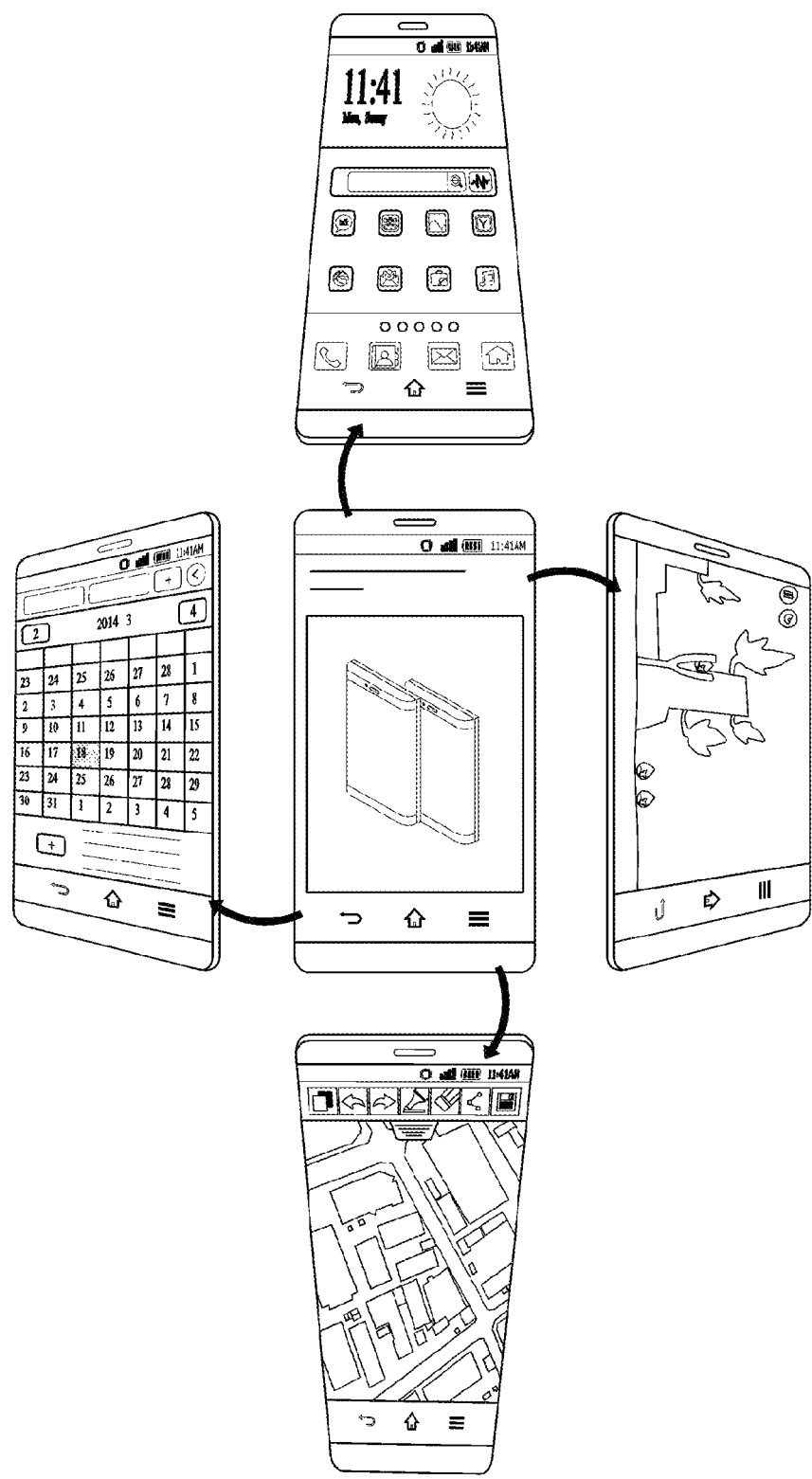
FIG. 19 is a diagram for one example of selecting a background application applicable to embodiments of the present invention.

FIG. 19 is a diagram for one example of selecting a background application applicable to embodiments of the present invention.

Referring to FIG. 19, while a specific function is run as a foreground, as shown in a center drawing of FIG. 19, it may be able to display a execution screen of a function run as a different background in response to a tilted direction.

Figure 20:
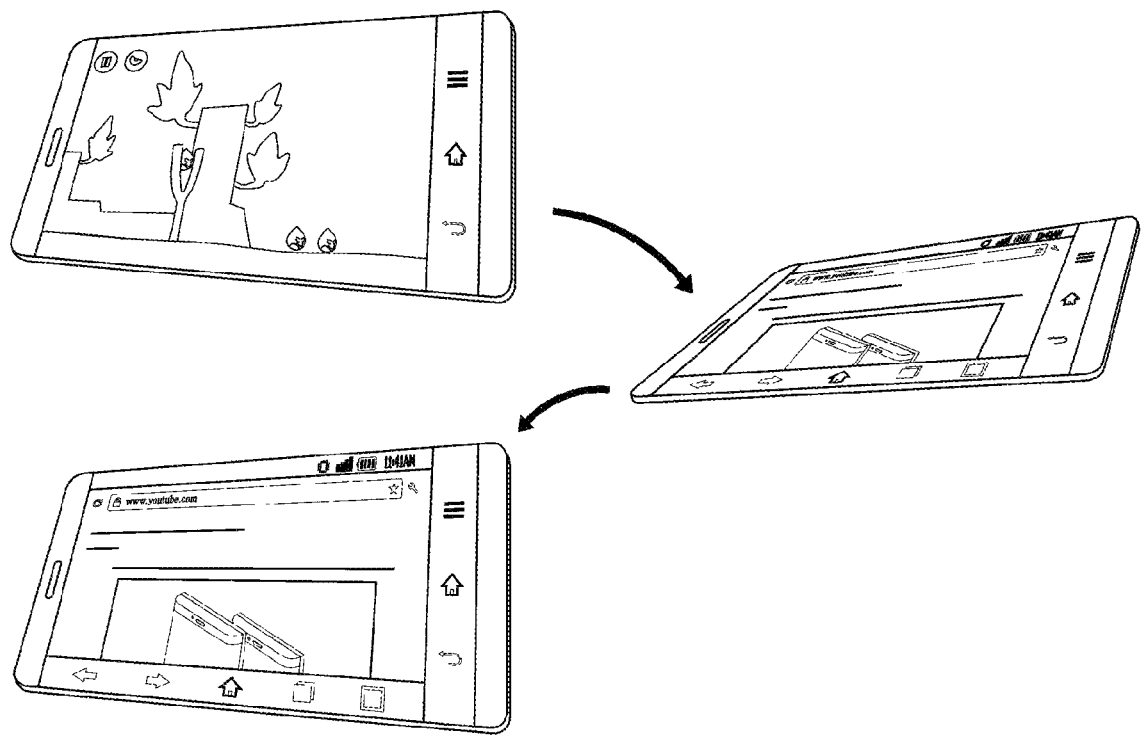
FIG. 20 is a diagram for one example of a function-to-function switching according to another embodiment of the present invention.

Moreover, in case that a mobile terminal is tilted and then returns to a previous position quickly in a prescribed time, as shown in FIG. 20, a function-to-function switching can be performed in direct.

Moreover, according to the embodiments mentioned in the foregoing description, as a mobile terminal is tilted, a execution screen of a function currently operating as a background is displayed, if a user waggles the mobile terminal, a execution screen of a previously displayed application (i.e., an application previously operating as a foreground) is displayed and the tilted state may be set back to a default state.

The above-described invention can be implemented in a program recorded medium as computer-readable codes. The computer-readable media may include all kinds of recording devices in which data readable by a computer system are stored. The computer-readable media may include HDD (hard disk drive), SSD (solid state disk), SDD (silicon disk drive), ROM, RAM, CD-ROM, magnetic tapes, floppy discs, optical data storage devices, and the like for example and also include carrier-wave type implementations (e.g., transmission via Internet). Further, the computer may include the controller 180 of the mobile terminal.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of controlling a mobile terminal, comprising the steps of:
   executing a first function;
   executing a second function and displaying an execution screen associated with the second function on a touchscreen;
   determining whether the mobile terminal has been tilted by an amount that exceeds a first threshold;
   when it is determined that the mobile terminal has been tilted by an amount that exceeds the first threshold, displaying the execution screen associated with the second function and an execution screen associated with the first function;
   determining whether a touch input to the touchscreen occurs while the execution screen associated with the second function and the execution screen associated with the first function are displayed; and
   displaying the execution screen associated with the first function when it is determined that the touch input has occurred,
   wherein:
   the execution screen associated with the first function is displayed with a first visual effect that comprises displaying the execution screen associated with the first function in a semitransparent manner, and displaying the execution screen associated with the second function and the execution screen associated with the first function comprises:
   gradually decreasing the level of transparency of the execution screen associated with the first function and gradually decreasing a level of opacity of the execution screen associated with the second function as the amount of mobile terminal tilt increases beyond the first threshold.

2. The method of claim 1, further comprising:
   setting a present orientation of the mobile terminal as a default state after executing the second function, wherein the determination whether the mobile terminal has been tilted by an amount that exceeds a first threshold is made with reference to the default state.

3. The method of claim 1, wherein the first function and the second function involve any one of a first application and a second application; a first view or tab and a second view or tab of the same application; and an application and an application list.

4. A method of controlling a mobile terminal, comprising the steps of:
   executing a first function;
   executing a second function and displaying an execution screen associated with the second function on a touchscreen;
   determining whether the mobile terminal has been tilted by an amount that exceeds a first threshold;
   when it is determined that the mobile terminal has been tilted by an amount that exceeds the first threshold, displaying the execution screen associated with the second function and an execution screen associated with the first function;
   determining whether a touch input to the touchscreen occurs while the execution screen associated with the second function and the execution screen associated with the first function are displayed; and
   displaying the execution screen associated with the first function when it is determined that the touch input has occurred,
   wherein:
   the execution screen associated with the first function is displayed with a first visual effect, and
   the method further comprising:
   determining whether a drag input in conjunction with the a touch input to the touchscreen occurs while the execution screen associated with the second function and the execution screen associated with the first function and the first visual effect are displayed;
   displaying the execution screen associated with the first function and the execution screen associated with the second function on a first region and a second region of the touchscreen, respectively, when a drag input in conjunction with a touch input is determined to have occurred and the drag input is in a first direction; and
   displaying the execution screen associated with the first function and the execution screen associated with the second function on the second region and the first region of the touchscreen, respectively, when a drag input in conjunction with a touch input is determined to have occurred and the drag input is in a second direction.

5. A method of controlling a mobile terminal, comprising the steps of:
   executing a first function;
   executing a second function and displaying an execution screen associated with the second function on a touchscreen;
   determining whether the mobile terminal has been tilted by an amount that exceeds a first threshold;

when it is determined that the mobile terminal has been tilted by an amount that exceeds the first threshold, displaying the execution screen associated with the second function and an execution screen associated with the first function;

determining whether a touch input to the touchscreen occurs while the execution screen associated with the second function and the execution screen associated with the first function are displayed; and displaying the execution screen associated with the first function when it is determined that the touch input has occurred, wherein:

the execution screen associated with the first function is displayed with a first visual effect, and the method further comprising:

determining whether the mobile terminal has been tilted by an amount that exceeds a second threshold;

when it is determined that the mobile terminal has been tilted by an amount that exceeds a second threshold, displaying the execution screen associated with the second function and the execution screen associated with the first function, wherein the execution screen associated with the first function is displayed with a second visual effect;

displaying the execution screen associated with the first function when the second visual effect is maintained for a predetermined period of time without any detection of a touch input to the touchscreen; and displaying the execution screen associated with the second function when a touch input is detected on the touchscreen while the second visual effect is being maintained prior to the expiration of the predetermined period of time.

6. A mobile terminal comprising:

a touchscreen;

a motion sensor that detects an amount of tilting of the mobile terminal; and a controller that:

executes a first function;

executes a second function and displays an execution screen associated with the second function on a touchscreen;

determines, based on a signal from the motion sensor, whether the mobile terminal has been tilted by an amount that exceeds a first threshold;

displays the execution screen associated with the second function and an execution screen associated with the first function, when it is determined that the mobile terminal has been tilted by an amount that exceeds the first threshold;

determines whether a touch input to the touchscreen occurs while the execution screen associated with the second function and the execution screen associated with the first function are displayed; and displays the execution screen associated with the first function when it is determined that the touch input has occurred, wherein the controller further:

displays the execution screen associated with the first function with a first visual effect that comprises displaying the execution screen associated with the first function in a semitransparent manner; and when displaying the execution screen associated with the second function and the execution screen associated with the first function, gradually decreases the level of transparency of the execution screen associated with the first function and gradually decreases a level of opacity of the execution screen associated with the second function as the amount of mobile terminal tilt increases beyond the first threshold.

7. The mobile terminal of claim 6, wherein the controller further sets a present orientation of the mobile terminal to a default state after executing the second function and determines whether the mobile terminal has been tilted by an amount that exceeds a first threshold with reference to the default state.

8. The mobile terminal of claim 6, wherein the first function and the second function involve any one of a first application and a second application; a first view or tab and a second view or tab of the same application; and an application and an application list.

9. A mobile terminal comprising:

a touchscreen;

a motion sensor that detects an amount of tilting of the mobile terminal; and a controller that:

executes a first function;

executes a second function and displays an execution screen associated with the second function on a touchscreen;

determines, based on a signal from the motion sensor, whether the mobile terminal has been tilted by an amount that exceeds a first threshold;

displays the execution screen associated with the second function and an execution screen associated with the first function, when it is determined that the mobile terminal has been tilted by an amount that exceeds the first threshold;

determines whether a touch input to the touchscreen occurs while the execution screen associated with the second function and the execution screen associated with the first function are displayed; and displays the execution screen associated with the first function when it is determined that the touch input has occurred, wherein the controller further:

displays the execution screen associated with the first function with a first visual effect;

determines whether a drag input in conjunction with a touch input to the touchscreen occurs while the execution screen associated with the second function and the execution screen associated with the first function and the first visual effect are displayed;

displays the execution screen associated with the first function and the execution screen associated with the second function on a first region and a second region of the touchscreen, respectively, when a drag input in conjunction with a touch input is determined to have occurred and the drag input is in a first direction; and displays the execution screen associated with the first function and the execution screen associated with the second function on the second region and the first region of the touchscreen, respectively, when a drag input in conjunction with a touch input is determined to have occurred and the drag input is in a second direction.

10. A mobile terminal comprising:

a touchscreen;

a motion sensor that detects an amount of tilting of the mobile terminal; and a controller that:

executes a first function;

executes a second function and displays an execution screen associated with the second function on a touchscreen;

determines, based on a signal from the motion sensor, whether the mobile terminal has been tilted by an amount that exceeds a first threshold;

displays the execution screen associated with the second function and an execution screen associated with the first function, when it is determined that the mobile terminal has been tilted by an amount that exceeds the first threshold;

determines whether a touch input to the touchscreen occurs while the execution screen associated with the second function and the execution screen associated with the first function are displayed; and displays the execution screen associated with the first function when it is determined that the touch input has occurred, wherein the controller further:

displays the execution screen associated with the first function with a first visual effect;

determines, based on a signal from the motion sensor, whether the mobile terminal has been tilted by an amount that exceeds a second threshold;

displays the execution screen associated with the second function and the execution screen associated with the first function along with a second visual effect, when the controller determines that the mobile terminal has been tilted by an amount that exceeds a second threshold;

displays the execution screen associated with the first function when the controller determines that the second visual effect is maintained without any touch input to the touchscreen for a predetermined period of time; and displays the execution screen associated with the second function when the controller determines that a touch input to the touchscreen has occurred while the second visual effect is being maintained prior to the expiration of the predetermined period of time.

\* \* \* \* \*